United States Patent Office 3,472,736
Patented Oct. 14, 1969

3,472,736
PROCESS FOR MAKING Δ⁴-CONENINE-11 ALPHA-OL-3-ONE
Jan de Flines and Willem Frederik van der Waard, Delft, Netherlands, assignors to Koninklijke Nederlandsche Gist- & Spiritusfabriek N.V., Delft, Netherlands, a corporation of the Netherlands
No Drawing. Continuation-in-part of application Ser. No. 436,273, Mar. 1, 1965. This application Mar. 7, 1967, Ser. No. 621,158
Claims priority, application Netherlands, Mar. 3, 1964, 6402112
Int. Cl. C12b 1/00; A61k 27/00; C07c 173/10
U.S. Cl. 195—51                                    1 Claim

ABSTRACT OF THE DISCLOSURE

Δ⁴-conenine-11α-ol-3-one, its acid addition salts and its quaternary ammonium derivatives and process for their preparation. Said compounds possess marked antiphlogistic activity with low toxicity.

Prior application

The present application is a continuation-in-part application of copending, commonly assigned U.S. patent application, Ser. No. 436,273, filed Mar. 1, 1965, now abandoned, which claims the priority of Netherlands application, Ser. No. 6402112, filed Mar. 3, 1964.

Objects of the invention

It is an object of the invention to provide the novel products, Δ⁴-conenine-11α-ol-3-one, its acid addition salts and its quaternary ammonium derivatives.

It is another object of the invention to provide a novel process for the preparation of Δ⁴-conenine-11α-ol-3-one and its derivatives.

It is another object of the invention to provide pharmacological compositions having antiphlogistic activity.

These and other objects and advantages of the invention will become obvious from the following detailed description.

The invention

The novel products of the invention are Δ⁴-conenine-11α-ol-3-one which has the structural formula

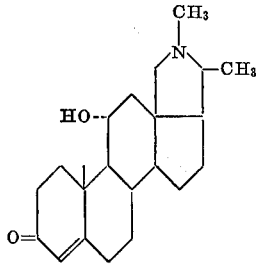

and its non-toxic, pharmaceutically acceptable acid addition salts and its quaternary ammonium derivatives. The said compounds possess marked antiphlogistic activity with low toxicity and are valuable starting materials for the preparation of therapeutically active compounds.

Examples of suitable acids for the preparation of the non-toxic, pharmaceutically acceptable acid addition salts are organic acids such as oxalic acid, tartaric acid, citric acid, succinic acid, acetic acid, fumaric acid, lactic acid, maleic acid, etc., and inorganic acids, such as nitric acid, sulfuric acid, phosphoric acid, boric acids, hydrogen halides such as hydrobromic acid, hydrogen iodide and hydrochloric acid. The hydrogen halides are preferred.

The quaternary ammonium compounds can be easily prepared in a conventional fashion such as by refluxing Δ⁴-conenine-11α-ol-3-one in a suitable solvent such as acetonitrile, alkanols, mixtures of alkanols and water, benzene, acetone with a quaternizing agent and recovering the resulting quaternary ammonium compounds.

Examples of suitable quaternizing agents are esters of aliphatic and araliphatic alcohols derived from strong acids such as sulfuric acid and hydrogen halides such as hydrogen chloride, hydrogen bromide and hydrogen iodide. Suitable alcohols are lower alkanols of 1 to 7 carbon atoms, lower alkenols of 2 to 7 carbon atoms, aryl-lower alkanols such as phenyl lower alkanols and substituted phenyl lower alkanols and cycloalkyl lower alkanols. Preferred quaternizing agents are lower alkyl and lower alkenyl halides such as methyl iodide, ethyl iodide and allyl bromide.

The novel process of the invention for the preparation of Δ⁴-conenine-11α-ol-3-one in practically quantitative yields comprises subjecting conessine, in the presence of oxygen, to the action of enzymes formed by cultivating *Stachybotrys parvispora*, (Hughes), (Centraal Bureau voor Schimmelcultures at Baarn, Netherlands), in a medium having a pH of at least 5 and containing at least 20 grams of assimilable carbohydrate per liter. The conversion can be illustrated by the following scheme:

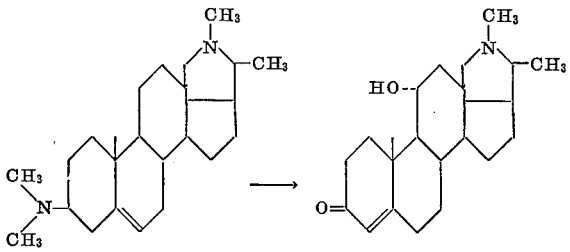

If desired, the compound obtained is used to prepare salts with acids or quaternary ammonium compounds. These salts can also be used for the isolation and/or purification of the reaction product.

Preferably a submerge culture of *Stachybotrys parvispora* (Hughes), is made to act under aerobic conditions on the starting material. The mixture may be shaken or stirred. The conessine is added to the culture as a solution or finely dispersed. After the conversion to Δ⁴-conenine-11α-ol-3-one has been completed, which is preferably checked by means of thin-layer chromatography, the final product is isolated from the culture, preferably by alkalization and extraction. By means of conventional methods, such as crystallization, chromatography or conversion into functional derivatives or salts, the final product can be obtained in a state of purity. Other concentrated culture media can also be used, provided they show a pH greater than 5 and contain at least 20 grams of assimilable carbohydrate per liter during the growth of the microorganism and the conversion.

The novel antiphlogistic compositions of the invention are comprised of a member selected from the group consisting of Δ⁴-conenine-11α-ol-3-one, its non-toxic pharmaceutically acceptable acid addition salts and its quaternary ammonium compounds and a major amount of a pharmaceutical carrier. The compositions are preferably in the form of injectable solutions or suspensions in ampoules or multiple dose flacons.

The novel method of the invention for treating inflammation in warm blooded animals comprises administering to warm blooded animals an effective amount of a member selected from the group consisting of Δ⁴-conenine-11α-ol-3-one, its non-toxic, pharmaceutically acceptable acid addition salts and its quaternary ammonium compounds. The usual effective dose is 50 mg./kg. twice a day depending upon the method of administration. The preferred method of administration is subcutaneous or intramuscular.

In the following examples there are described several preferred embodiments to illustrate the invention. However, it should be understood that the invention is not intended to be limited to the specific embodiments.

Example I

A medium containing 40 g. of glucose, 3 g. of sodium nitrate, 0.5 g. of potassium chloride, 0.5 g. of magnesium sulfate·7H$_2$O, 1 g. of potassium dihydrogen phosphate and 0.01 g. of iron (II) sulfate. 7H$_2$0 per liter of water was brought to a pH of 5 by the addition of a few drops of concentrated sodium hydroxide solution. Fifteen liters of this solution were transferred to a stainless steel fermentation vessel equipped with an aerator and a stirrer, after which the medium was sterilized with steam for 30 minutes at 120° C.

After cooling, inoculation was effected with 500 ml. of a 48-hour-old shaking culture (rate of rotation 250 r.p.m., stroke 2.5 cm.) of *Stachybotrys parvispora* (Hughes). The medium of this shaking culture contained 20 g. of glucose and 20 g. of corn steep liquor (calculated on dry substance), per liter. The culture in the fermentation vessel was maintained at a temperature of 26° C., while 10 l. of sterile air per minute were passed through and stirring was effected at a rate of 200 r.p.m. 24 hours after inoculation, a solution of 4.5 g. of conessine in 250 ml. of dilute sulfuric acid (0.5 percent) was added under sterile conditions and stirring was resumed for another 75 hours at the same temperature. From chromatographic analysis it appeared that the conessine had been converted into $\Delta^4$-conenine-11$\alpha$-ol-3-one.

The reaction mixture was acidified to pH 3 with 6 N sulfuric acid and filtered. The filtrate was made alkaline with 11 N sodium hydroxide solution (to pH 10) and then extracted three times with 0.3 volume of methyl isobutyl ketone. The combined extracts were extracted twice with 0.15 volume of 0.05 N sulfuric acid, the pH of the acid extract was brought to 10 with 11 N sodium hydroxide solution, and the extract was subsequently extracted three times with 0.15 volume of methyl isobutyl ketone. This extract was finally evaporated to dryness under reduced pressure. The crude $\Delta^4$-conenine-11$\alpha$-ol-3-one weighed 3.4 g. It was dissolved in a mixture of 2.5 ml. of acetic acid and 24 l. of water and to this solution was added 4.6 g. of potassium iodide dissolved in 4.5 ml. of water. Immediately atfer this addition, crystallization of the hydroiodide of $\Delta^4$-conenine-11$\alpha$-ol-3-one started. After having stood for some time at 2° C., the crystalline precipitate was filtered off and dried to obtain a yield of 4.9 g. of the said product. Through crystallization from a mixture of methanol and ether, 3.43 g. of pure product with a melting point of 229.5–230.5° C. (with decomposition) was obtained. From thin-layer chromatography it appeared that the product contained no more impurities.

*Elemental analysis.*—Calculated: C, 57.78%; H, 7.44%; N, 3.06%; I, 27.88%. Found: C, 57.85%; H, 7.68%; N, 3.08%; I, 27.54%.

Through dissolution of the hydroiodide of $\Delta^4$-conenine-11$\alpha$-ol-3-one in water, alkalization, shaking with methyl isobutyl ketone and evaporation of the extract to dryness, the free base was obtained. The latter possessed the following physical characteristics:

*Infrared spectrum.*—absorption maxima at 366 cm.$^{-1}$, 1665 cm.$^{-1}$, and 1610 cm.$^{-1}$ (hydroxyl group and $\alpha,\beta$-unsaturated ketone).

*Ultraviolet spectrum.*—absorption maximum at 241 m$\mu$($\epsilon$=14,600). $[\alpha]_D$=138° (c.=1 in chloroform).

Oxidation with chromium trioxide yielded $\Delta^4$-conenine-3,11-dione, which, according to the RF- value in paper chromatography and thin-layer chromatography, the melting point, the mixed melting point and the infrared spectrum was identical with a synthetic product, (J. F. Kerwin c.s., J. Org. Chem. 27, 3628 (1962)). The oxidation product melted at 162° C. and showed optical rotation $[\alpha]_D$=+270° (c.=1 in chloroform). The infrared spectrum showed no absorption maximum at 3600 cm.$^{-1}$, but instead a maximum at 1703 cm.$^{-1}$ (oxo group in cyclohexane ring). The ultraviolet spectrum showed an absorption maximum at 239 m$\mu$($\epsilon$=16,100).

The $\Delta^4$-conenine-11$\alpha$-ol-3-one was readily acetylated at room temperature with the aid of a mixture of acetic anhydride and pyridine, which, in conjunction with the value of the molecular rotation, indicates an 11$\alpha$-hydroxy compound.

Instead of the hydroiodide, the salicylate of $\Delta^4$-conenine -11$\alpha$-ol-3-one was also successfully used for the isolation and purification of the compound.

The salicylate salt possessed the following physical constants:

*Elemental analysis.*—Calculated: C, 72.35%; H, 8.30%; N, 2.91%. Found: C, 72.31%; H, 8.30%; N, 2.91%.

Melting point: 247°–249° C. (with decomposition).

Example II.—Preparation of $\Delta^4$-conenine-11$\alpha$-ol-3-one methiodide

A mixture of 400 mg. of $\Delta^4$-conenine-11$\alpha$-ol-3-one, 2 ml. of methyl iodide and 5 ml. of methanol was refluxed for two hours. Then another ml. of methyl iodide was added and the mixture was refluxed for 2 more hours. The resulting reaction mixture was evaporated to dryness under reduced pressure and the remaining residue was dissolved in a small amount of methanol. Acetone was added to the methanol solution and a precipitate formed. The solution was filtered off and the precipitate was washed with acetone and dried to obtain 370 mg. of $\Delta^4$-conenine-11$\alpha$-ol-3-one methoiodide which after recrystallization from a mixture of acetonemethanol had a melting point of 293.5–294.5° C.

*Elemental analysis.*—C$_{23}$H$_{36}$O$_2$NI calculated: C, 56.91%; H, 9.48%; N, 2.89%; I, 26.19%. Found: C, 57.12%; H, 9.63%; N, 2.63%; I, 25.85%.

Example III.—Preparation of $\Delta^4$-conenine-11$\alpha$-ol-3-one ethyliodide

A solution of 1 gm. of $\Delta^4$-conenine-11$\alpha$-ol-3-one in 20 ml. of acetonitrile and 4 ml. of ethyl iodide was refluxed for 5 hours after which the reaction mixture was cooled and evaporated to dryness under reduced pressure. The residue was recrystallized from methanol by the addition of acetone to obtain 540 mg. of $\Delta^4$-conenine-11$\alpha$-ol-3-one ethyl iodide having a melting point of 248–250° C. and a specific rotation $[\alpha]_D$=+93° (c.=1 in methanol).

Ultraviolet spectrum in methanol $$\lambda_{max}.\ 224\ m\mu\ E^{1\%}_{1cm.}=398$$
$$237\ m\mu\ E^{1\%}_{1cm.}=337$$

Infrared spectrum (KBr): absorption maxima at 3365 cm.$^{-1}$, 1670 cm.$^{-1}$ and 1613 cm.$^{-1}$ (N$\circ$N—CH$_3$).

N.M.R. spectrum (CDCl$_3$—$\delta$ in p.p.m.): 1.30 (C$_{19}$—H$_3$); 1.49 (C$_{21}$—H$_3$; doublet); 2.99 (N$^+$—CH$_3$); 3.32 (N$^+$—CH$_2$); 3.70 (OH); 4.25 (C$_{11}$—H); 5.61 (C$_4$—H).

*Elemental analysis.*—C$_{24}$H$_{38}$NO$_2$I calculated: C, 57.72%; H, 7.62%; N, 2.81%; I, 25.45%. Found: C, 57.54%; H, 7.52%; N, 2.73%; I, 25.63%. Found: C, 57.50%; H, 7.49%; N, 2.70%; I, 25.59%.

Example IV.—Preparation of $\Delta^4$-conenine-11$\alpha$-ol-3-one allyl bromide Using the procedure of Example III $\Delta^4$-conenine-11$\alpha$-ol-3-one was reacted with allyl bromide to obtain $\Delta^4$-conenine-11$\alpha$-ol-3-one allyl bromide as an amorphus solid having a specific rotation $[\alpha]_D$=+98° (c.=1 in methanol).

Ultraviolet spectrum (in methanol): absorption maximum at $$241 \text{ m}\mu \ (E_{1\ cm.}^{1\%} = 292)$$

Infrared spectrum (KBr): absorption maxima at 3325 cm.$^{-1}$, 1667 cm.$^{-1}$, 1612 cm.$^{-1}$ (NoN—CH$_3$).

N.M.R. spectrum ((CD$_3$)$_2$ SO: $\delta$ in p.p.m.): 1.30 (C$_{19}$—H$_3$); 1.50 (doublet; C$_{21}$—H$_3$); 3.09 (N$^+$—CH$_3$); 3.40 (N$^+$—CH$_2$); 3.60 (OH); 4.3 (C$_{11}$—H); 5.5–6.2 (C$_4$—H and 3-vinyl protons).

*Elemental analysis.*—C$_{25}$H$_{38}$NO$_2$Br calculated: C, 64.66%; H, 8.19%; N, 3.02%; Br, 17.24%. Found: C, 64.46%; H, 8.33%; N, 2.88%; Br, 17.32%. Found: C, 64.40%; H, 8.30%; N, 2.85%; Br, 17.29%.

We claim:

1. A process for the preparation of $\Delta^4$-conenine-11$\alpha$-ol-3-one comprising subjecting, in the presence of oxygen, conessine to the action of enzymes formed by cultivating *Stachybotrys parvispora* (Hughes) in a medium having a pH of at least 5 and containing at least 20 grams of assimilable carbohydrate per liter to form $\Delta^4$-conenine-11$\alpha$-ol-3-one.

References Cited
UNITED STATES PATENTS

| | | | |
|---|---|---|---|
| 3,004,965 | 10/1961 | Kerwin et al. | 260—239.5 |
| 3,033,861 | 5/1962 | Kerwin et al. | 260—239.55 |

ALEX MAZEL, Primary Examiner

JOSE TOVAR, Assistant Examiner

U.S. Cl. X.R.

260—239.5; 424—274